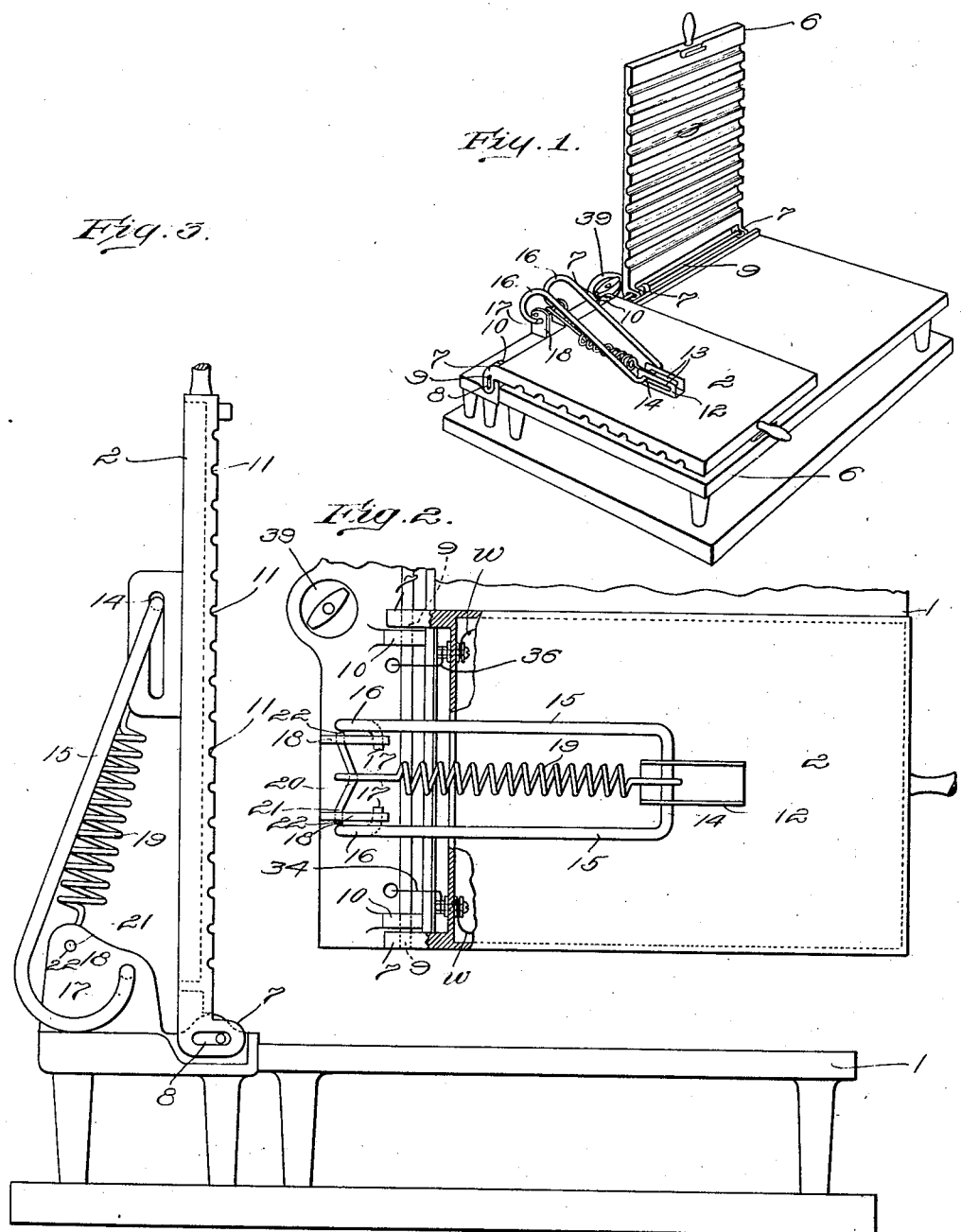
H. B. GALE.
ELECTRIC TOASTER AND GRIDDLE.
APPLICATION FILED NOV. 16, 1909.
992,417.
Patented May 16, 1911.
2 SHEETS—SHEET 1.

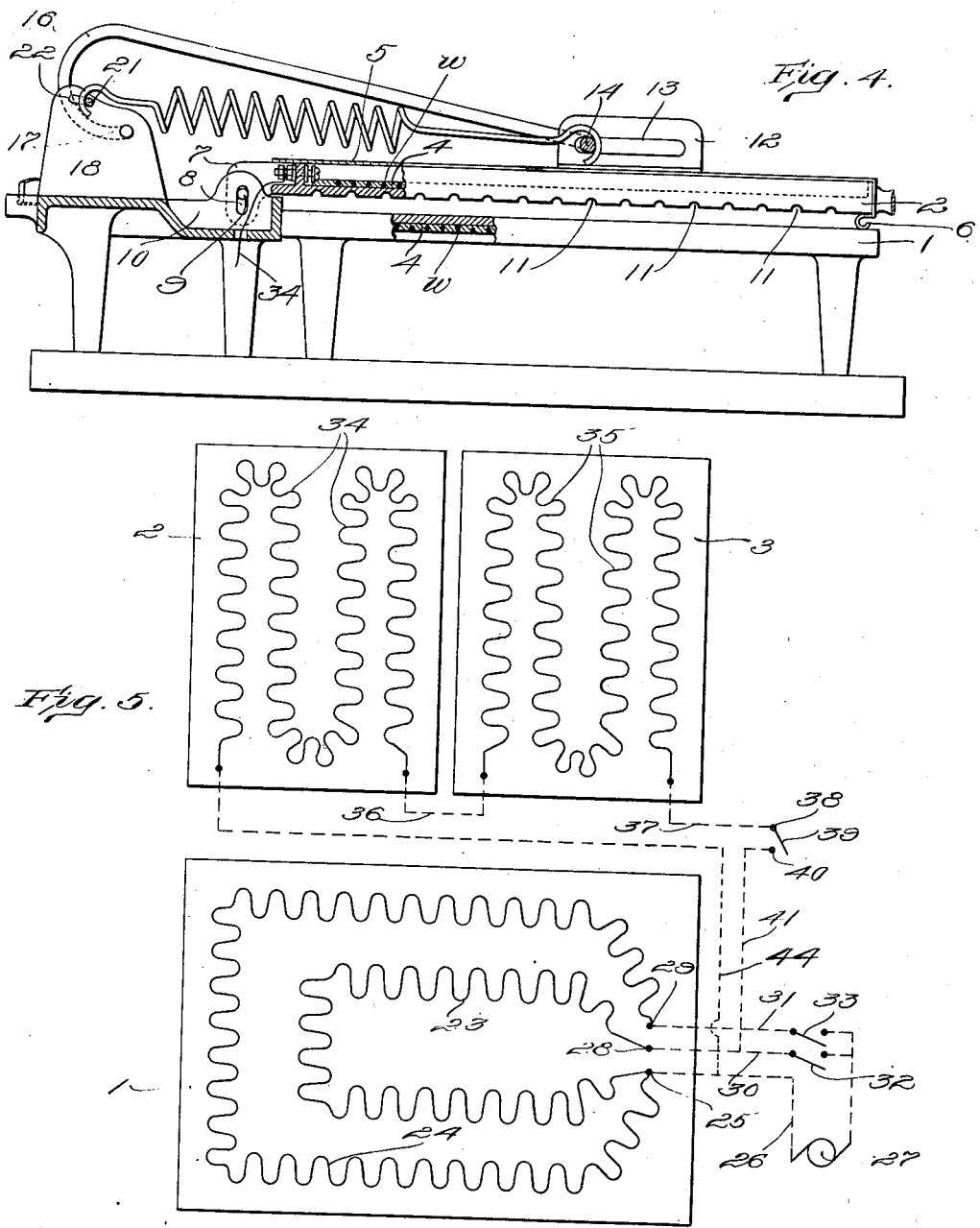

UNITED STATES PATENT OFFICE.

HORACE B. GALE, OF NATICK, MASSACHUSETTS, ASSIGNOR TO SIMPLEX ELECTRIC HEATING COMPANY, OF BOSTON, MASSACHUSETTS, A CORPORATION OF MASSACHUSETTS.

ELECTRIC TOASTER AND GRIDDLE.

992,417.

Specification of Letters Patent. Patented May 16, 1911.

Application filed November 16, 1909. Serial No. 528,346.

*To all whom it may concern:*

Be it known that I, HORACE B. GALE, a citizen of the United States, and resident of Natick, in the county of Middlesex and State of Massachusetts, have invented an Improvement in Electric Toasters and Griddles, of which the following description, in connection with the accompanying drawings, is a specification, like letters on the drawings representing like parts.

My invention aims to provide a toaster, and preferably a combined toaster and griddle, of large capacity adapted to hotel use and the like.

Among the important features of novelty of my invention are the provision of means for toasting both sides of the bread at once, toasting them uniformly and properly, means for engaging the bread with a uniform pressure at all points, means for relieving the weight of the superposed engaging portion so as not to press the bread too much, means for relieving the opening movement of wear and shock in opening, means to prevent undue heat radiation from the toaster and to prevent overheating thereof in the absence of bread, and the provision of a wide range of heat regulation, including means for obtaining a strong heat (for griddle purposes) while cutting out all heat from the top, or a light heat for both the bottom and top (for toasting purposes).

The various constructional details and further advantages of my invention will appear more at length in the course of the following description taken with reference to the accompanying drawings, in which I have shown a preferred embodiment of the invention.

In the drawings, Figure 1 is a perspective view of the complete apparatus; Fig. 2 is an enlarged fragmentary plan view thereof; Fig. 3 shows the same in side elevation, raised, and Fig. 4 is a similar side elevation, down; and Fig. 5 is a plan view showing the wiring.

The apparatus, in the preferred embodiment of the drawings, is of rectangular shape, although the shape, size, and various other details may be widely varied within the spirit and scope of my invention, and comprises a lower heating plate or table 1 and two upper heating plates 2, 3, hinged thereto. Each plate is provided with resistance wires $w$ embedded in porcelain or vitreous enamel 4 fused directly to the back of the heating surface or plate portion of the heaters, whereby the heat is applied directly without substantial loss to the bread or other article being treated, and the top heaters 2, 3, are provided with an inclosing shield or cover 5 to prevent undue heat radiation, said cover being bent downwardly and curved around into partial spring shape at 6 at its front edge to take the shock of being dropped carelessly down on the plate or table 1 and also to raise the upper heaters 2, 3, normally above the plate or table 1 sufficiently to maintain a slight air gap between the upper plates and the lower plate or table to prevent overheating in case they should be left closed without any bread or other intervening article to work upon. At their rear ends each plate 2, 3, is provided with ears or hinges 7 containing vertical slots 8 engaged by loosely-fitting pins 9 projecting from adjacent bosses or ears 10, so that the plate 2 is free to adjust itself at a greater or less distance from the plate or table 1 and yet remain in parallelism therewith to suit perfectly either thin slices of bread or thick slices of bread or other articles being toasted or heated. The heating surface of the top plates is preferably provided with grooves 11 for the escape of steam from the bread, which grooves may be of any desired fancy or other configuration so as correspondingly to mark the bread or other object.

In order that equal pressure may be applied by the top plates to all points of the bread, I provide means for supporting the plate from approximately its center of gravity. Each top plate is provided with a bail or loop-shaped guide 12 projecting upwardly from its top side, forming a slot 13 for receiving the U-shaped end 14 of a heavy supporting wire, rod or arm 15 which is curved upwardly and over to the rear at 16 and thence downwardly and forward to 17 where its ends are pivotally mounted in a standard 18 of the main frame. When the plate is raised the rear end 16 strikes the bed and the rod has sufficient spring to take up the shock as a shock arrester. A helical spring 19 is secured at its forward end to the end 14 of the supporting arm 15 and extends thence rearwardly to the bent forward portion 20 of a bar 21 pivoted at its ends at 22 in the standard 18 above and at the rear of the pivot 17. By reason of this construction it will be understood that the spring 19 bears at all times some of the weight of the top plate, and exerts an increasing lifting power by reason of the changing leverage as said top plate swings upwardly, so that when the top plate is in a vertical position the spring maintains it in that position. The spring also coöperates with the arm 15 in easing the downward movement of the plate, the weight and lifting force being in approximate equilibrium when the plate is about half-way down. When the plate approaches its lower position its weight overbalances the diminishing lifting force of the spring, allowing the plate to rest upon the bread with force enough to insure proper contact for heat transmission, but still with a sufficient part of the weight supported by the arm 15 and spring 19 to prevent the bread being crushed or pressed too hard. In order that the upper heating plate may be free to adjust itself to rest uniformly on the bread at all points of its surface, the arm 15 is arranged to coöperate with the guide 12 in flexibly supporting the plate at approximately its center of gravity, to which point the end 14 slides in the loosely-fitting slot 13 as the plate reaches its lower position. This balancing action of the spring 19 and arm 15 also insure that, notwithstanding the large size and considerable weight of the top plate, its movement up and down is accomplished smoothly and easily, almost without effort on the part of the user.

The wiring of the plates is best shown in Fig. 5, where it will be seen that the table 1 has a low heating resistance wire or winding 23 and a medium heating resistance wire or winding 24 whose terminals are brought together at one end at 25 and connected by a wire 26 to a suitable source 27 of current, while the opposite terminals of said two wires are led out independently from the binding posts 28, 29, by wires 30, 31, to the source of energy, being independently controlled by switches 32, 33. As herein shown, the top plates are provided respectively with resistance winding 34, 35 connected at 36, 37, with one contact 38 of a switch 39 whose other contact 40 connects by a conductor 41 with one of the feed wires, as the wire 30. The circuit is completed from the resistances 34, 35 by the conductor 44 to the wire 26. Thus for ordinary toasting purposes where a comparatively low heat is required, the switch 33 is left open, the switches 32 and 39 being closed, thereby maintaining the table 1 and top plates 2, 3, at the right uniform toasting temperature. If the top plates are not required, the switch 39 is opened, thereby leaving the bottom plate or table 1 heated by the low resistance 23 alone. If a higher degree of heat is required, the switch 32 may be opened and the switch 33 closed, thereby giving a higher degree of heat to the table, and if a still higher degree of heat is required, both switches 32 and 33 are closed, thereby giving the effects of the combined heats of both resistances 23 and 24. Thus the apparatus is adapted to all the probable wants of regular hotel service. The advantage of having two independently operable top plates is that not only is the capacity of the apparatus thereby increased, but also thereby a practically continuous delivery of toast is made possible inasmuch as a supply may be toasting in one while being removed from the other, and a fresh supply placed therein, and vice versa. It will be understood that the apparatus is not limited to two of these top plates but there may be one or more.

Having described my invention, what I claim as new and desire to secure by Letters Patent is, 1. A device of the kind described, comprising opposite electric heater plates relatively movable for receiving between them an article, such as a slice of bread, to be toasted on both sides at once, and means for maintaining them in direct contact with the opposite sides of an article to be toasted at all parts thereof irrespective of variations in thickness of its several portions.

2. A device of the kind described, comprising an electrically heated table for receiving a slice of bread to be toasted, a superposed electrically heated plate to rest upon the top side of the bread, and means permitting said top plate to adjust itself automatically into direct contact with all parts of the adjacent side of the bread irrespective of the thickness of the latter within considerable limits.

3. A device of the kind described, comprising an electrically heated table for receiving a slice of bread to be toasted, a superposed electrically heated plate to rest upon the top side of the bread, and means permitting said top plate to adjust itself automatically into direct contact with all parts of the adjacent side of thick or thin slices, said top plate having on its under side grooves for the escape of air and moisture during the toasting operation.

4. A device of the kind described, comprising an electrically heated table for receiving a slice of bread to be toasted, a superposed electrically heated plate hinged to swing upwardly away from said table and downwardly into toasting position, the hinging means including provision to permit the plate to adjust itself automatically into substantial parallelism with the table at different distances therefrom.

5. A device of the kind described, comprising an electrically heated table to receive the bread to be toasted, an electrically heated plate mounted above said table to rest on top of the bread, and hinging means at one end of said plate consisting of a vertically slotted member and a pin, relatively movable, one stationary and the other carried by said plate, to permit the plate to maintain approximate parallelism with the table at varying heights therefrom, so as to maintain proper toasting engagement with the bread at all points thereof.

6. A device of the kind described, comprising an electrically heated table for the bread to rest upon, a coöperating electrically heated plate movably mounted to rest on top of the bread, and means for partially relieving the bread of a portion of the weight of said plate so as not to press the bread too much.

7. A device of the kind described, comprising an electrically heated table for the bread to rest upon, a coöperating electrically heated plate movably mounted to rest on top of the bread, and means coöperating with said plate for equalizing the pressure thereof on the bread at all points thereof.

8. A device of the kind described, comprising an electrically heated table to receive the bread, an electrically heated loosely hinged plate to swing down on top of the bread, and yielding supporting means partially suspending said plate from its center of gravity so as partially to counterbalance the plate and to keep its weight on the bread uniform at all points thereof.

9. A device of the kind described, comprising a table to receive the bread, resistance wires embedded in vitreous enamel directly against the under side of said table, a coöperating plate movably mounted to rest above said table on top of the bread, and resistance wires embedded in vitreous enamel directly against the upper side of said plate, said plate having a cover with a dead air space between the cover and said enamel for restricting heat radiation upwardly from the plate.

10. A device of the kind described, comprising an electrically heated table, an electrically heated plate movably mounted above said table to coöperate therewith, and spring means mounted in relation to said table and to said plate to relieve the shock when the plate is permitted to fall on the table and to limit the approach of the plate toward the table so as to prevent over-heating.

11. A device of the kind described, comprising a horizontal electrically heated table, an electrically heated plate movably mounted above said table to coöperate therewith and spring means depending from the edge of said plate to limit the approach of the plate toward the table so as to prevent over-heating and relieve the shock when the plate is permitted to fall on the table.

12. A device of the kind described, comprising a horizontal electrically heated table, and a plate hinged above the table to coöperate therewith, the hinging mechanism including a supporting arm having a yielding portion arranged to strike against a stationary part as the plate swings approximately to raised position, for relieving the shock in stopping the plate.

13. A device of the kind described, comprising a horizontal electrically heated table for the bread to lie on, an electrically heated plate pivotally mounted above said table to rest on top of the bread when toasting, and a spring-actuated arm adapted to support a portion of the weight of the plate when the latter is in approximately horizontal position.

14. A device of the kind described, comprising a horizontal electrically heated table for toasting the bottom side of the bread, an electrically heated plate for toasting the top side of the bread, a hinge for said plate at one edge thereof, a pivoted supporting arm having sliding engagement with said plate adjacent the middle thereof, and a spring normally exerting an upward strain on said arm and plate.

In testimony whereof, I have signed my name to this specification, in the presence of two subscribing witnesses.

HORACE B. GALE.

Witnesses:
  GEO. H. MAXWELL,
  M. J. SPALDING.